Figure 1:
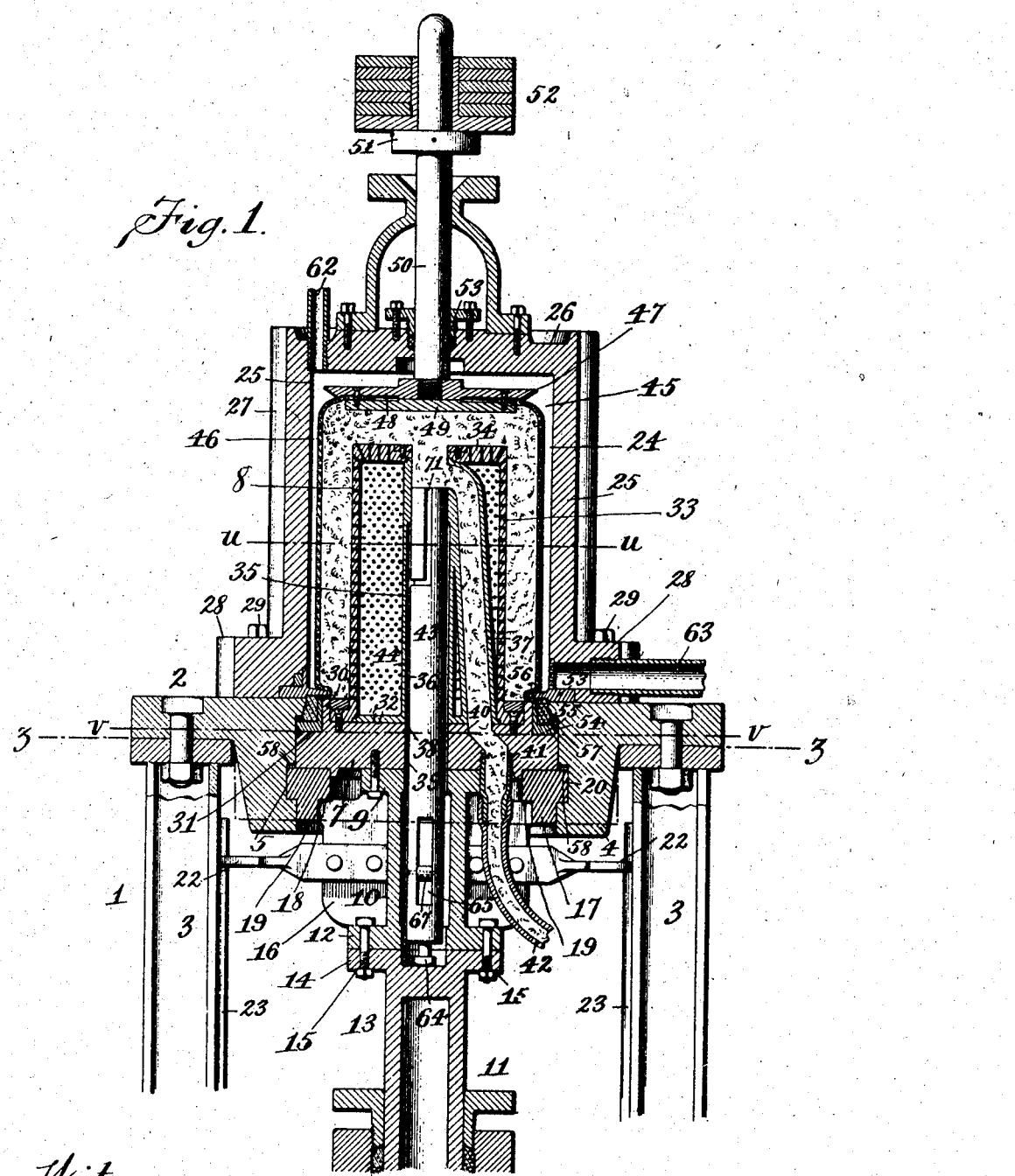

No. 781,295. PATENTED JAN. 31, 1905.
C. D. ORMISTON.
PULP MOLDING MACHINE.
APPLICATION FILED FEB. 2, 1903.

5 SHEETS—SHEET 3.

Witnesses:
Julius Lankes
Bert Mason

Cyrus D. Ormiston, Inventor.
By Neuhart & Burkhart,
Attorneys.

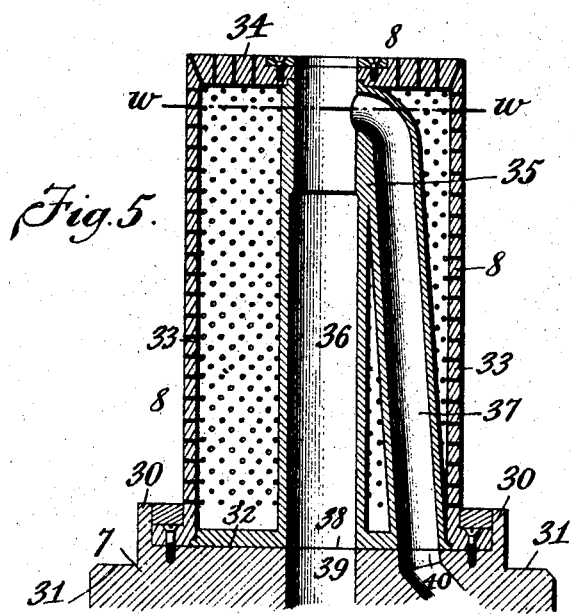
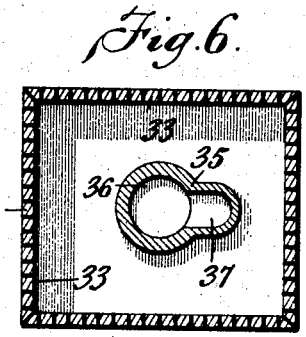
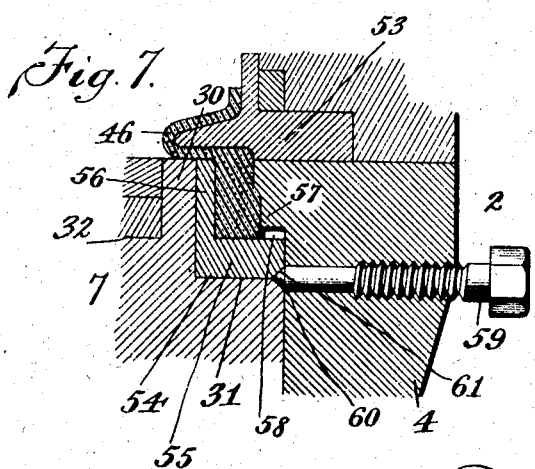
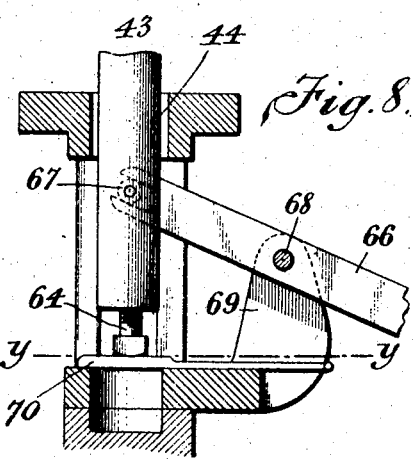
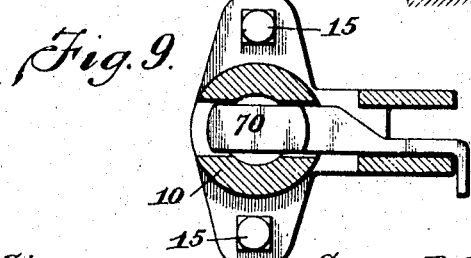

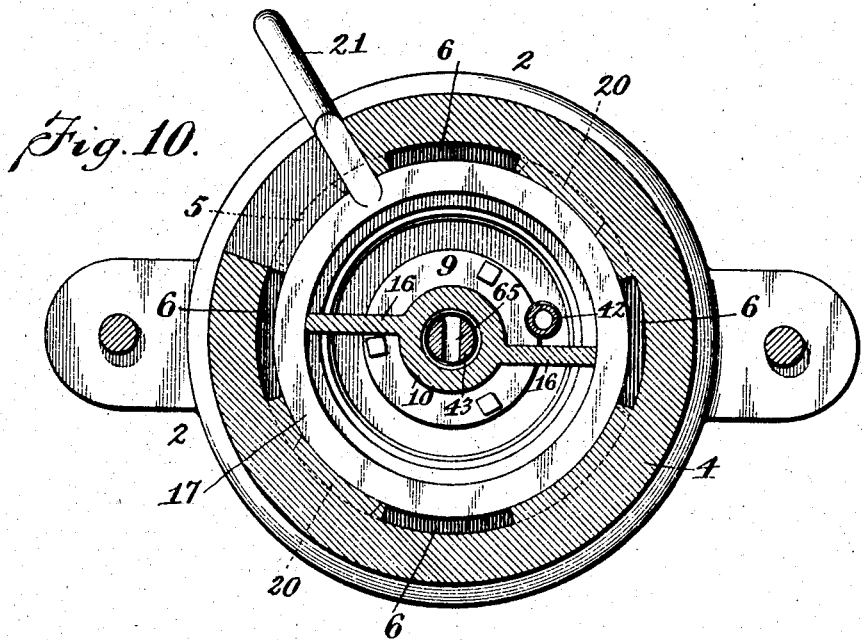
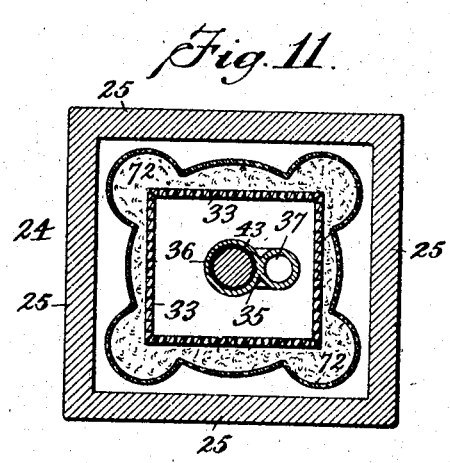
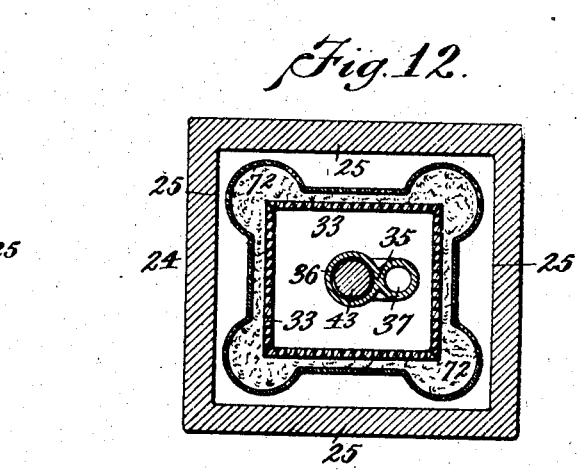

No. 781,295.

Patented January 31, 1905.

UNITED STATES PATENT OFFICE.

CYRUS D. ORMISTON, OF LOCKPORT, NEW YORK, ASSIGNOR OF ONE-HALF TO JESSE PETERSON, OF LOCKPORT, NEW YORK.

PULP-MOLDING MACHINE.

SPECIFICATION forming part of Letters Patent No. 781,295, dated January 31, 1905.

Application filed February 2, 1903. Serial No. 141,508.

*To all whom it may concern:*

Be it known that I, CYRUS D. ORMISTON, of Lockport, in the county of Niagara and State of New York, have invented certain new and useful Improvements in Pulp-Molding Machines, of which the following is a specification.

My invention relates to pulp-molding machines of that type in which a former, an exterior molding device, and a dome or confining-chamber are employed and in which hydrostatic pressure is applied to the exterior molding device to cause the pulp to be compressed against the former.

In molding hollow articles having angular walls, particularly articles of a rectangular formation in cross-section, it has heretofore been a difficult matter when compressing the pulp against the former to retain sufficient pulp at the corners of the article, the tendency of the exterior molding device, which in part is formed of a cylindrical expansible bag, being to crowd the pulp toward the center of the former, and as the corners are more distant from the center of the former than the vertical center of each wall the pulp is necessarily forced in opposite directions from each corner toward the vertical centers of the walls forming such corner, with the result that the corners of the article are much thinner than other portions thereof and are consequently weak and even liable to crack or part when removed from the former. In some instances it has been found that in the act of molding an article the pulp was forced away from the corners entirely.

My invention has for its primary object the production of a molding-machine of this type which will mold a hollow article having angular side walls so that every portion of the walls will be of an even thickness or, as may occasionally happen, that the walls will be of an even thickness throughout, with the thickness of the material at the corners somewhat increased, which can then be trimmed as desired.

Other objects of my invention are to support the locking-ring on the piston or piston-rod, to construct the bag-ring and bed-piece so that an annular space is formed between the two to permit the lower edge of the bag to be compressed into the same to take up wear or leakage and whereby all possibility of cutting the rubber or otherwise destroying the edge of the bag is eliminated entirely, to support the head of the former so as to prevent the possibility of causing the same to collapse under the high pressure to which it is subjected, and to provide an improved center plunger-valve which will permit the introduction of the stock into the molding-space when lowered and which has coöperating mechanism at its lower end to elevate the same and cut off the supply of stock and improved means for adjusting the extent of the upward movement of the plunger-valve to bring the same even with the outer surface of the head of the former.

To these ends the invention consists in providing means whereby a greater quantity of stock is held within the molding-space in line with the corners of the former than at other points thereof and in the new and novel arrangement, construction, and combination of parts, as will be hereinafter described, and particularly pointed out in the appended claims.

Figure 2:
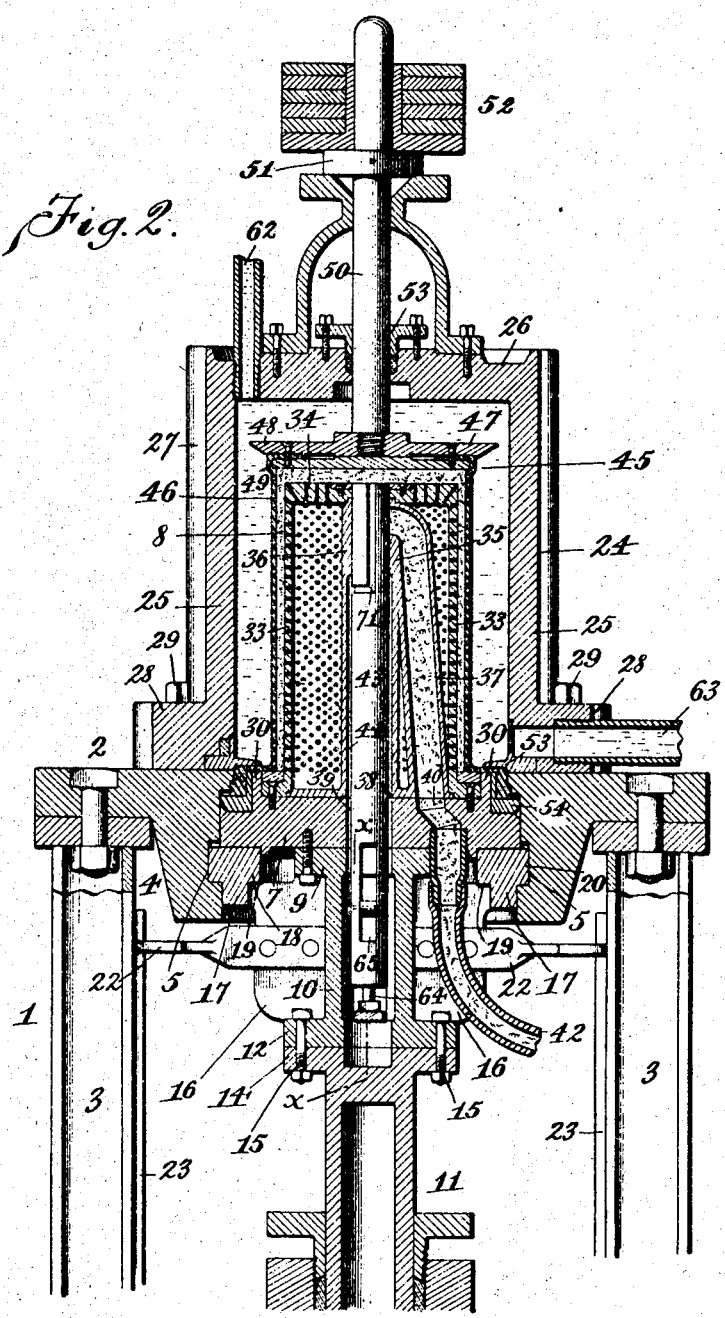
Figure 3:
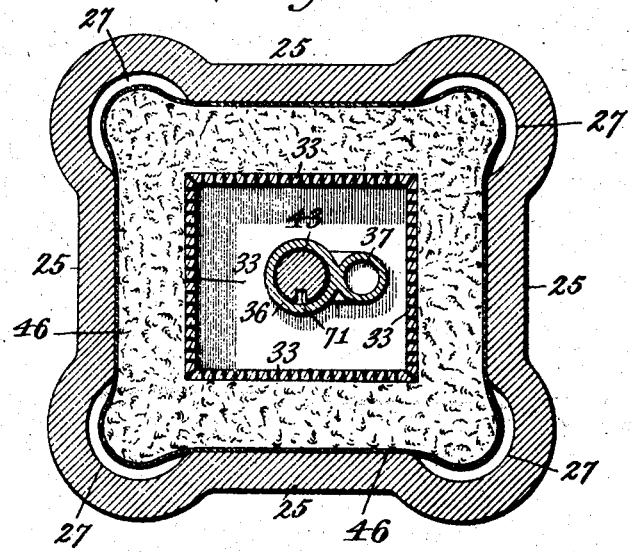
Figure 4:
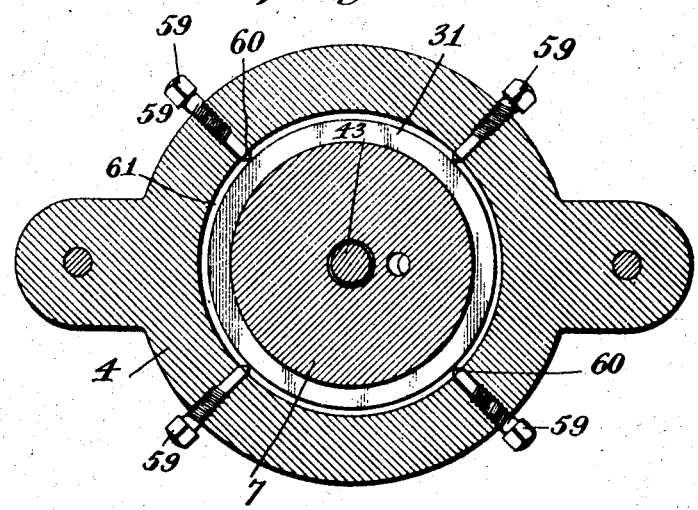

Referring to the drawings, Figure 1 is a central vertical section of my improved machine, showing the plunger-valve open, which controls the entrance of stock to the molding-space, the molding-bag expanded, and the chime-plate elevated by the stock introduced into the molding-space. Fig. 2 is a similar section showing the water under pressure acting against the exterior molding device to compress the pulp against the former. Fig. 3 is an enlarged horizontal section taken on line $u\ u$, Fig. 1, the expansible molding-bag being shown against the walls of the dome and extended into the corner-pockets to permit the accumulation of a greater quantity of stock at such points. Fig. 4 is a horizontal section taken on line $v\ v$, Fig. 1. Fig. 5 is an enlarged vertical section through the former and a portion of the platform supporting the same. Fig. 6 is a horizontal section taken on line $w\ w$, Fig. 5. Fig. 7 is an enlarged vertical section through the lower end of the expansible molding-bag and the adjacent parts of the machine. Fig. 8 is an enlarged vertical section taken on line x x, Fig. 2. Fig. 9 is a horizontal section taken on line y y, Fig. 8. Fig. 10 is an enlarged horizontal section taken on line z z, Fig. 1, looking up. Figs. 11 and 12 are horizontal sections through a former, expansible molding-bag, and dome, showing modified forms of my invention.

Referring to the drawings in detail, like numerals of reference refer to like parts in the several figures.

The numeral 1 designates the supporting-frame, comprising an annular bed-plate or table 2 and standards 3, to which said bed-plate is bolted. The said bed-plate is provided with an annular depending flange 4, having an annular groove 5 formed in its inner periphery and vertical notches 6 extending from said annular groove to the lower end of the flange 4.

7 designates the movable platform to which the hollow former 8 is secured, which is herein shown as being rectangular in cross-section and which is bolted to the external flange 9 of the piston extension 10, forming part of a hydraulic jack 11, which may be of any suitable construction. The said extension 10 is hollow and cylindrical in form and at its lower end is provided with flanges 12. The upper end of the piston 13 is also provided with flanges 14, and bolts 15 are passed through said flanges to connect the piston with its extension 10. The latter, which may be considered as a continuation of the piston, is provided with supporting-webs 16 cast or secured thereon, as may be desired, said webs receiving support from the flanges 12 of the piston extension. A locking-ring 17 is supported on the supporting-webs 16 and is provided with an internal flange 18, forming a shoulder 19, against which the said supporting-webs 16 bear, thus avoiding all possibility of the ring being displaced when lowered with the piston. Outwardly-extending lugs 20 are formed on the locking-ring, and when the piston is being elevated these lugs are adapted to pass through the vertical notches 6 and then enter the annular groove 5, when the ring is partly revolved. This locks the platform and the hollow superposed former in their elevated positions. A handle 21 is provided to conveniently manipulate the locking-ring. Secured to the supporting-webs 16 are guide-bars 22, which are guided on guide-rails 23, formed on the standards 3, and adapted to prevent turning of the piston and all parts of the machine supported thereon.

A dome or confining-chamber 24 is provided, which may be of any suitable design, depending considerably on the shape of the former. As the former 8 is of rectangular formation and the articles to be molded by the machine are to be of a similar formation, the dome is made of corresponding shape and comprises side walls 25 and a top wall 26. Pockets or enlargements 27 are formed at the vertical corners of the dome, and securing-lugs 28 extend from the lower end thereof, through which bolts 29 are passed and enter the supporting-table of the machine.

Projecting upwardly from the platform is an annular flange 30, which forms both a ledge 31 on the marginal portion thereof and a circular recess 32, in which the lower end of the hollow former is secured.

The hollow perforated former comprises side walls 33 and a head or top wall 34 and, as is common, is faced with fine wire-gauze. (Not shown.) The lower end thereof is fitted in the recess 32 and secured to the platform by screws or other suitable means. A hollow casting 35 is located in the hollow former and comprises the valve-tube 36 and the stock-inlet tube 37. This casting is supported on the platform 7 and supports the head of the hollow former, preventing the collapsing of the former under the high pressure to which it is subjected. The said casting is so located in the former that the valve-tube registers with an opening 38 in the head of the former and with an opening 39 in the platform 7. The lower end of the stock-inlet tube registers with an opening 40 formed in the platform, in which a nozzle 41 is secured. A hose 42 or other flexible connection is affixed to said nozzle and leads to the stock-supply, its function being to permit the platform and the superposed former to be raised and lowered. The said stock-inlet tube is arranged at a slight angle to the valve-tube 36 and is curved laterally to communicate with the latter at the upper end thereof.

A plunger-valve 43 is normally supported with its lower end on the closed upper end of the piston proper and passes up through the piston extension and the platform and enters the valve-tube 36, the upper portion of which is of corresponding diameter and receives the upper end of the plunger-valve with a snug fit. An annular space 44 is provided between the lower portion of the valve-tube and the plunger-valve and also between the latter and the platform and piston extension. When in its normal position, the upper end of the plunger-valve is even with or below the stock-inlet of the valve-tube, as shown in Fig. 1.

45 designates the exterior molding device, comprising in its preferred form a cylindrical rubber or other expansible bag 46, which surrounds the hollow former, and a chime-plate 47, movable vertically and having the upper end of the expansible bag 46 secured thereto. The said chime-plate is formed in two sections, an upper section 48 and a lower section 49, which are held together by screws or other suitable means and between the marginal portions of which the upper end of the expansible bag is securely clamped. A guide-rod 50 is secured to the chime-plate and passes up through the upper wall or cap of the dome and through a yoke secured to the latter. A stop-collar 51 is formed on or secured to the guide-rod 50 and supports a weight 52, which serves under normal conditions to keep the chime-plate 47 in its lowermost position, which position is fixed by the said collar striking the upper end of the yoke. A stuffing-box 53 is arranged in the cap of the dome through which the guide-rod passes.

The lower end of the expansible bag is clamped between two clamping-rings 53 54, respectively, the upper ring 53 being located in a recess formed at the lower edge of the dome and necessarily having its outer edge of rectangular outline to fit into the rectangular walls of the dome. The lower clamping-ring 54 is of angular formation in cross-section and consists of a horizontal portion 55 and a vertical portion 56. The clamping-ring 54 fits onto the annular ledge 31 of the platform, and the thickened lower end of the expansible bag is clamped between the two clamping-rings. The confining-wall of the annular bed-plate has an inwardly-projecting flange 57, which overlaps the horizontal portion 55 of the clamping-ring 54, and an annular space 58 is provided between the said horizontal portion of the clamping-ring and the flange 57, which allows the lower thickened end of the expansible bag to be compressed without the liability of cutting the same as the material forming the bag may enter the said space. The clamping-ring 54, which is held immovable except for adjustment, is supported by a number of adjusting-screws 59 passing horizontally through the bed-plate and having conical ends 60, which bear against the chamfered lower face 61 of the lower clamping-ring 54. The said adjusting-screws can be quickly and conveniently adjusted to take up leakage and wear.

The dome is provided with an inlet 62, through which water under pressure enters and acts against the external molding device, and an outlet 63 to discharge the water from the dome, each having a valve (not shown) to control the same, as is common.

The plunger-valve, as shown in Fig. 1, is in its lowermost position and allows communication between the stock-inlet and the molding-space between the hollow former and the external molding device. The stock is forced into the molding-space under pressure and causes the expansible bag to expand and the chime-plate to rise until both are stopped by the confining-walls of the dome. The stock is directed equally to all parts of the molding-space except at the enlarged corners of the dome, where a greater quantity of stock is gathered.

When the molding-space is filled, the plunger-valve is elevated and shuts off communication between said space and the stock-inlet tube, in which position the upper end thereof is held flush with the upper surface of the hollow former, which causes the inner face of the bottom of the formed article to be perfectly smooth.

Entering the lower end of the plunger-valve is an adjusting-bolt 64, and arranged near the lower end thereof is a vertical slot 65, arranged to receive the bifurcated end of a lever 66, which straddles a friction-roller 67, located in the said slot. The said lever is fulcrumed between its ends on a pivot-pin 68, held in lugs 69, projecting from the piston extension. A stop-plate 70 is provided which is placed underneath the plunger-valve when elevated, thus holding the same against movement. Should the upper end of the plunger-valve fail for any reason to be held flush with the outer surface of the hollow former, the bolt 64 may be adjusted to bring the upper end of the same to its proper plane.

When the molding-space is filled with the stock and the plunger-valve is elevated, the water is allowed to enter the dome under pressure through the inlet 62 and act against the exterior molding device to compress the pulp, which action causes all moisture to enter the former through the perforations therein and also to enter a groove 71, formed lengthwise in the plunger-valve. The said groove extends from the upper end of said valve to a point below the upper end of the annular space surrounding said valve and is thence directed horizontally to partly surround the same. The moisture enters the upper end of the said groove and is directed to the annular space, where it is allowed to seek its course out of the machine. The moisture entering the former through the perforations formed therein may be discharged in any suitable manner.

By accumulating a greater quantity of stock at the corners of the angular former than at other portions thereof the stock when compressed will still retain the desired thickness, even though the tendency be to crowd a portion thereof toward the center, which, owing to the angular walls, would deflect the stock toward the vertical centers of the said walls. In this manner the enlargements or pockets in the corners of the dome may by experiment be made of a size to accommodate the exact extra quantity of stock which is deflected from the corners when the stock is being compressed, thus forming a hollow article having walls of even thickness at every point thereof. If more than the quantity deflected from the corners of the former is accumulated at the four corners of the dome, the corners of the formed article will be thicker than the sides, and in such cases the article can be trimmed as desired.

In the modification shown in Fig. 11 the expansible bag is also of cylindrical formation, and instead of forming pockets at the corners of the dome the said bag is provided with pockets or enlargements 72, which are arranged in line with the corners of the hollow former.

In the modification shown in Fig. 12 the expansible bag is of rectangular formation and also has pockets or enlargements in the corners thereof.

All reference made hereinafter in the claims to the longitudinal edges or corners of the former are to be considered as meaning in the direction of length of the machine.

This invention is susceptible to many changes in form, construction, and arrangement of parts without departing from the spirit thereof or sacrificing any of the advantages of the same.

Having thus described my invention, what I claim is—

1. In a pulp molding machine for molding angular articles, the combination of an angular former, a dome surrounding said former, an exterior molding device between the dome and the former, means allowing the accumulation of an extra quantity of stock in line with the longitudinal edges or corners of the former which form the upwardly-directed edges of the molded article, and means for causing the stock to be compressed against the former.

2. In a pulp-molding machine for molding angular articles, the combination of an angular former, a dome surrounding said former and being separated therefrom by a molding-space, an expansible bag surrounding said former within said molding-space, means whereby an additional supply of stock is held within said expansible bag in line with the longitudinal edges or corners of said former which form the upwardly-directed edges of the molded article, and means for causing the stock to be compressed against the said former.

3. In a pulp-molding machine the combination of an angular former, a dome surrounding said former, an exterior molding device between the dome and the former, means allowing the accumulation of an extra quantity of stock in line with the vertical edges or corners of the former, and means for causing the stock to be compressed against the former.

4. In a pulp-molding machine, the combination of an angular former, a dome surrounding said former and being separated therefrom by a molding-space, an expansible bag surrounding said former within said molding-space, means whereby an additional supply of stock is held within said expansible bag in line with the vertical corners of said former, and means for causing the stock to be compressed against the said former.

5. In a pulp-molding machine, the combination of an angular former, a correspondingly-shaped dome surrounding said former and having a pocket in each of its side corners, an expansible bag between said former and the dome, means for supplying stock between said former and the said bag, and means for causing said bag to compress the stock against said former.

6. In a pulp-molding machine for forming rectangular boxes, the combination of a rectangular former, a rectangular dome surrounding said former and being separated therefrom by a molding-space, said rectangular dome having a pocket in each of its side corners, a cylindrical expansible bag surrounding said former within the said molding-space, means whereby stock is admitted under pressure to the molding-space so as to force said bag against the dome and into said pockets, and means for compressing the stock against the former.

7. In a pulp-molding machine, the combination of an angular former, a dome surrounding said former and being separated therefrom by an intervening space, an expansible bag located in said intervening space and being adapted to expand against the surrounding walls of the dome, said intervening space being enlarged at points in line with the side edges or corners of said former, and means for causing the stock to be compressed against the said former.

8. In a machine for forming hollow articles from pulp, the combination of a platform, a hollow former having a head and being secured to said platform and means for supporting said head from the said platform.

9. In a machine for molding hollow articles from pulp, the combination of a platform, a hollow former comprising side walls and a head closing the upper end thereof and being secured to said platform, a valve-tube supported on said platform and extending upward to support the head of the former, a stock-inlet tube connected to the upper end of said valve-tube, and a plunger-valve movable in said valve-tube and being adapted to control the supply of stock to the machine.

10. In a machine for molding hollow articles from pulp, the combination of the platform, a hollow former supported on said platform and having a head provided with an opening, a plunger-valve adapted to open and close said opening and having a slot arranged lengthwise therein at the lower end thereof, a friction-roller held in said slot, and an operating-lever having a bifurcated end straddling said friction-roller and being fulcrumed between its ends.

11. In a machine for molding hollow articles from pulp, the combination of the platform, a hollow former supported on said platform and having a head provided with an opening, a plunger-valve adapted to open and close said opening and having a slot arranged lengthwise therein at the lower end thereof, a friction-roller held in said slot, an operating-lever having a bifurcated end straddling said friction-roller and being fulcrumed between its ends, and a stop-plate for holding said plunger-valve in its elevated position.

12. In a machine for molding hollow articles from pulp, the combination of the platform, a hollow former supported on said platform and having a head provided with an opening, a plunger-valve adapted to open and close said opening and having a slot arranged lengthwise therein at the lower end thereof, a friction-roller held in said slot, an operating-lever having a bifurcated end straddling said friction-roller and being fulcrumed between its ends, an adjusting-bolt projecting from the lower end of said plunger-valve, and a stop-plate against which said adjusting-bolt bears when the plunger-valve is elevated.

13. In a machine for molding hollow articles from pulp, the combination of the bed-plate having a circular opening and a flange projecting inwardly from the upper end of said opening, a platform held in said opening, a former secured to said platform, a dome supported on the bed-plate, an expansible bag surrounding said former and having a thickened lower end, a clamping-ring held between the dome and the bed-plate and being adapted to bear against the outer side of said bag, a second clamping-ring having its marginal portion located beneath the internal flange on the bed-plate and being separated therefrom by an intervening space, said last-mentioned clamping-ring being adapted to bear against the inner side and the edge of the lower thickened end of the bag and force the same tightly against said internal flange on the bed-plate and against the first-mentioned clamping-ring, and means for adjusting the second-mentioned clamping-ring to take up wear and leakage.

14. In a machine for molding hollow articles from pulp, the combination of an expansible bag forming part of the exterior molding device, a clamping-ring having a chamfered lower edge and being adapted to clamp the lower end of the said bag, and adjusting and clamping bolts passing horizontally through a fixed part of the machine and having conical ends adapted to engage the chamfered lower edge of the said clamping-ring to cause the same to securely clamp the lower end of the said bag against fixed parts of the machine.

15. In a machine for molding hollow articles from pulp, the combination with the bed-plate having an opening therein, of a platform having the former for the article secured thereto and being movable vertically, a piston supporting said platform and being located beneath the same, suitable means for operating said piston, a locking-ring engaging the lower marginal portion of the platform and being adapted to lock into said bed-plate to hold said platform elevated, and means for supporting said locking-ring on the piston.

16. In a machine for molding hollow articles from pulp, the combination with the bed-plate having an opening therein, of a platform having the former for the article secured thereto and being movable vertically, a piston operative by any suitable means supporting said platform, a locking-ring engaging the lower marginal portion of the platform and being adapted to lock into said bed-plate to hold said platform elevated, and supporting-webs projecting from said piston and having their upper ends engaging said locking-ring to support the same.

17. In a machine for molding hollow articles from pulp, the combination with the bed-plate having an opening therein, of a platform having the former for the article secured thereto and being movable vertically, a piston operative by any suitable means supporting said platform, a locking-ring engaging the lower marginal portion of the platform and being adapted to lock into said bed-plate to hold said platform elevated, said locking-ring surrounding the upper end of the piston and being supported thereby.

In testimony whereof I have affixed my signature in the presence of two subscribing witnesses.

CYRUS D. ORMISTON.

Witnesses:
CHAS. E. FOLGER,
CHAS. F. BURKHART.